United States Patent
Noda et al.

(10) Patent No.: US 8,124,974 B2
(45) Date of Patent: Feb. 28, 2012

(54) DISPLAY DEVICE

(75) Inventors: Takeshi Noda, Mobara (JP); Toshio Miyazawa, Mobara (JP); Takuo Kaitoh, Mobara (JP); Takumi Shigaki, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 143 days.

(21) Appl. No.: 12/536,097

(22) Filed: Aug. 5, 2009

(65) Prior Publication Data

US 2010/0032674 A1 Feb. 11, 2010

(30) Foreign Application Priority Data

Aug. 6, 2008 (JP) ................................ 2008-202525

(51) Int. Cl.
*H01L 33/00* (2010.01)
(52) U.S. Cl. ...... 257/59; 257/72; 257/347; 257/E33.053
(58) Field of Classification Search .................... 257/59, 257/72, 347, E33.053
See application file for complete search history.

(56) References Cited

U.S. PATENT DOCUMENTS

| 2003/0227590 A1 | 12/2003 | Oke et al. |
| 2004/0104878 A1* | 6/2004 | Tsutsui et al. .................. 345/89 |
| 2004/0119075 A1 | 6/2004 | Murade |
| 2005/0236970 A1* | 10/2005 | Matsudate et al. ............ 313/500 |
| 2006/0132035 A1* | 6/2006 | Sawai et al. .................... 313/512 |

FOREIGN PATENT DOCUMENTS

CN 1624931 6/2005

* cited by examiner

*Primary Examiner* — Victor A Mandala
*Assistant Examiner* — Whitney T Moore
(74) *Attorney, Agent, or Firm* — Antonelli, Terry, Stout & Kraus, LLP.

(57) ABSTRACT

A display device is provided in which at least first and second thin film transistors are formed on a substrate, including a gate electrode formed on a semiconductor layer with a gate insulating film in between. The semiconductor layer is divided into individual regions for each film transistor, and is provided with a common region and LDD regions between a channel region and a drain region, as well as between the channel region and a source region. The gate electrode is formed as an integrated gate electrode for the first and second thin film transistors that faces the common region, the channel region and the LDD regions of the first thin film transistor and the channel region and the LDD regions of the second thin film transistor.

8 Claims, 12 Drawing Sheets

PRIOR ART

DISPLAY DEVICE

The present application claims priority over Japanese Application JP 2008-202525 filed on Aug. 6, 2008, the contents of which are hereby incorporated into this application by reference.

BACKGROUND OF THE INVENTION (1) Field of the Invention

The present invention relates to a display device, and in particular, to a display device where thin film transistors are formed on a substrate.

(2) Related Art Statement

In active matrix type liquid crystal display devices, for example, thin film transistors are formed of switching elements in pixel regions on a substrate.

In this case, it is preferable for the formed thin film transistors to be of a so-called bottom gate type, with gate electrodes provided on the substrate side of the semiconductor layer, with a gate insulating film in between. This is because the gate electrodes function as a light shielding film, the semiconductor layer can be prevented from being irradiated with light from the backlight, and thus, thin film transistors having little leaked current resulting from light can be formed.

In addition, a so-called multi-gate structure has come to be used in bottom gate type thin film transistors, where a number of thin film transistors are formed, and the semiconductor layer is divided into individual regions for each thin film transistor. In thin film transistors having a multi-gate structure, the off current can be reduced by lowering the concentration of the electrical field between the drain region and the channel region.

Furthermore, this structure usually has an LDD (lightly doped drain) region where the impurity concentration is lower than in the channel region and the drain region between the channel region and the drain region, as well as between the channel region and the source region, in the semiconductor layer of each thin film transistor. The LDD regions can lower the concentration of the electrical field, which can be easily generated between the drain region and the channel region in the semiconductor layer, and are easy to form in bottom gate type tin film transistors, without increasing the number of manufacturing steps.

FIG. 8 is a cross sectional diagram showing the configuration of a thin film transistor formed in the display device described above. The thin film transistor TFT in FIG. 8 is formed of a first thin film transistor TFT1 and a second thin film transistor TFT2, which have a semiconductor layer PS which is divided into individual regions. In this case, the portion at approximately the center of the above described semiconductor layer PS is a common region CMD shared by the source region SD of the first thin film transistor TFT1 and the drain region DD of the second thin film transistor TFT2. In addition, the gate electrode of the first thin film transistor TFT1 (denoted by GT1 in figure) and the gate electrode of the second thin film transistor TFT 2 (denoted by GT2 in figure) are separately formed on the substrate SUB1 side of the above described semiconductor layer PS with the gate insulating film GI in between (but electrically connected to each other). In FIG. 8, the symbol DD is for drain regions, the symbol SD is for source regions, and the symbol LD is for LDD regions. This is all for the structure in FIG. 8. This structure is described in further detail below, in order to describe the structure shown in FIG. 1, which corresponds to FIG. 8.

SUMMARY OF THE INVENTION

Problem to be Solved by the Invention

The length Lp of the common region CMD shared by the source region SD of the first thin film transistor TFT1 and the drain region DD of the second thin film transistor TFT2 in the thin film transistor TFT formed as described above must be at least approximately 5 µm.

This is because the inconsistency in the size of the gate electrodes GT1 and GT2 during processing (for example 0.5 µm), the inconsistency in the size when developed (for example 0.5 µm), and the size of the part where the masks for forming the gate electrodes GT1 and GT2 and the channel region in the semiconductor layer PS do not perfectly overlap (for example 1 µm) must be taken into consideration, in addition to the minimum size for developing the photoresist using photolithographic technology (for example 3 µm).

Therefore, there are limitations as to how much the thin film transistors TFT having the above described structure can be reduced in size.

An object of the present invention is to provide a display device where small bottom gate type thin film transistors with a lower off current can be formed.

Means for Solving Problem

In the display device according to the present invention, the gate electrode of the first thin film transistor TFT1 and the gate electrode of the second thin film transistor TFT2 are formed so as to be connected to each other and integrated, instead of separately, and thus, thin film transistors can be manufactured taking only the minimum size for developing the photoresist using photolithographic technology into consideration.

The present invention can provide the following configuration, for example.

(1) The display device according to the present invention is a display device where thin film transistors are formed on a substrate, characterized in that in the above described thin film transistors, a gate electrode is formed on a semiconductor layer with a gate insulating film in between, the above described thin film transistors are formed of at least a first thin film transistor and a second thin film transistor, and the above described semiconductor layer is divided into individual regions for each film transistor, the above described semiconductor layer is provided with a common region shared either by the drain region of the above described first thin film transistor and the source region of the above described second thin film transistor or by the source region of the above described first thin film transistor and the drain region of the above described second thin film transistor, in the first thin film transistor and the second thin film transistor, the semiconductor layer is provided with LDD regions where the impurity concentration is lower than in the above described drain region and the above described source region, between the channel region and the drain region, as well as between the channel region and the source region, and the above described gate electrode is formed so as to overlap with the above described common region in the above described semiconductor layer and face at least the above described channel region and the above described LDD regions of the above described first thin film transistor and the above described channel region and the above described LDD regions of the above described second thin film transistor.

(2) The display device according to the present invention is the display device according to (1), characterized in that the above described semiconductor layer is formed of polysilicon.

(3) The display device according to the present invention is the display device according to (1), characterized in that the gate electrode is formed on the above described substrate side of the semiconductor layer with a gate insulating film in between in the above described thin film transistors.

(4) The display device according to the present invention is the display device according to (1), characterized in that the above described drain regions, the above described source regions and the above described common regions are in island form within the individual regions of the above described semiconductor layer, and the above described LDD regions are formed so as to surround the above described drain regions, the above described source regions and the above described common regions as viewed in a plane.

(5) The display device according to the present invention is the display device according to (1), characterized in that the above described thin film transistors are formed within separate pixels.

(6) The display device according to the present invention is the display device according to (1), characterized in that the above described thin film transistors are formed within a scan signal drive circuit.

(7) The display device according to the present invention is the display device according to (1), characterized in that the above described thin film transistors are formed within an RGB switching circuit.

(8) The display device according to the present invention is the display device according to (1), characterized in that the display device is a liquid crystal display device.

Here, the above described structures are merely examples, and appropriate modifications are possible, as long as the technological of the present invention is not deviated from. In addition, examples of the structure of the present invention other those described above will become more clear from the description of the entirety of the present specification and the drawings.

Effects of the Invention

In the display device formed as described above, small thin film transistors with a low off current can be formed.

Other effects of the present invention will become more clear from the description of the entirety of the specification.

DETAILED DESCRIPTION OF THE INVENTION

The embodiments of the present invention are described below in reference to the drawings. Here, the same symbols are used for components which are the same or similar in the embodiments in the figures, and the descriptions thereof are not repeated.

First Embodiment

Entire Structure of Display Device

Figure 2:
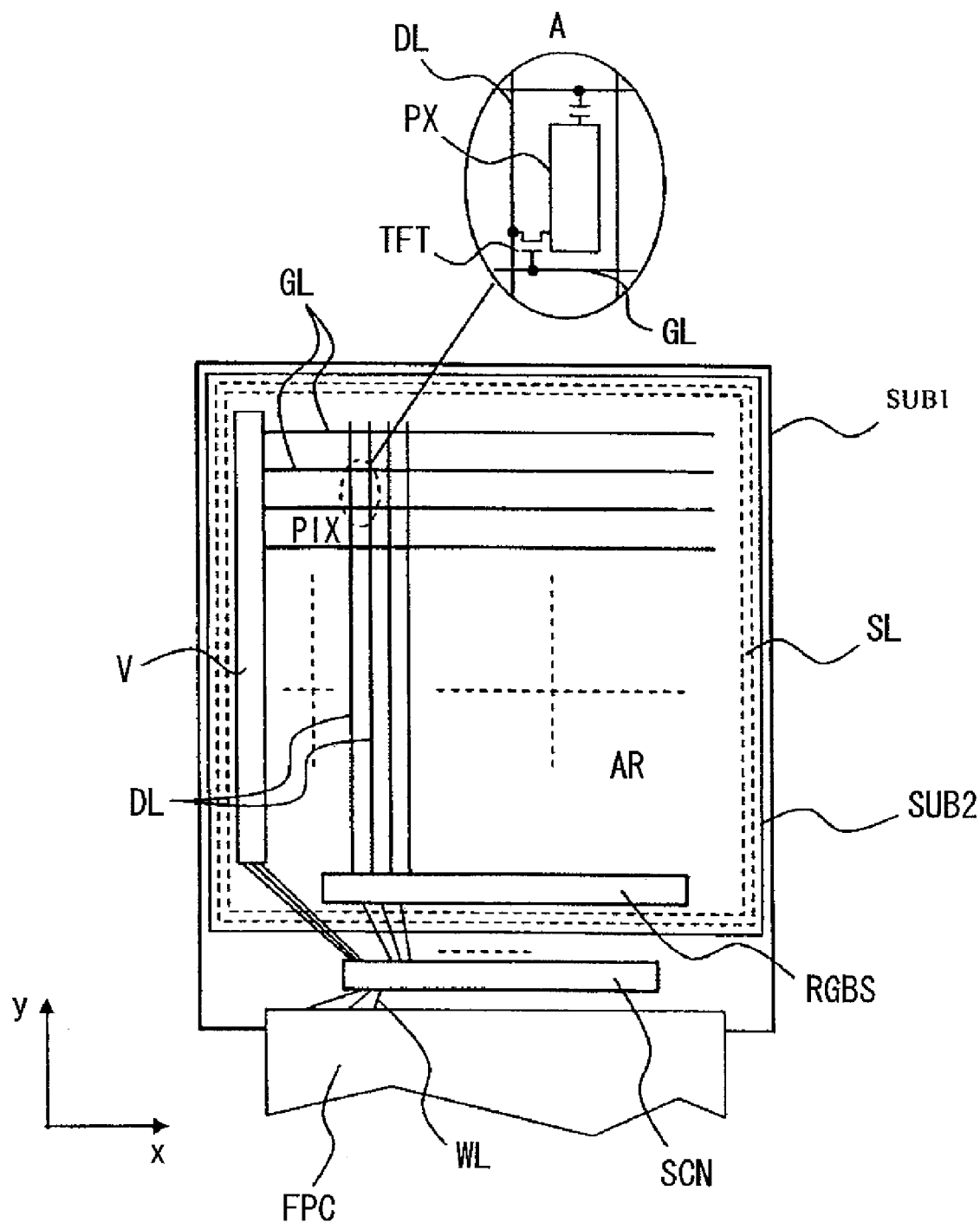
FIG. 2 is a schematic plan diagram showing the structure of the display device according to the first embodiment of the present invention.

FIG. 2 is a plan diagram showing the display device according to the first embodiment of the present invention. FIG. 2 shows the entire structure of a liquid crystal display device which can be incorporated in a cellular phone, for example.

The liquid crystal display device in FIG. 2 is provided with a housing formed of rectangular substrates SUB1 and SUB2 made of glass, for example. Liquid crystal (not shown) is sealed between the substrate SUB1 and the substrate SUB2 using a sealing material SL which holds the substrate SUB1 and the substrate SUB2 together. The center portion of the region where the liquid crystal is sealed using the sealing material SL forms a liquid crystal display region AR, and the thin, peripheral region does not. A number of pixels are arranged in a matrix in this liquid crystal display region AR.

A side portion on the lower side of the substrate SUB1 has a portion that is exposed from the substrate SUB2, and one end of a flexible substrate FPC through which a signal is inputted from the inside is connected to this portion. In addition, a semiconductor device SCN made of a chip is mounted on the substrate SUB1, in a region between the flexible substrate FPC and the substrate SUB2. Signals are inputted into this semiconductor device SCN from the flexible substrate FPC via wires WL formed on the surface of the substrate SUB1.

In addition, a scan signal drive circuit V is formed in a region between the sealing material SL and the liquid crystal display region AR, on the left of the liquid crystal display region A, for example, and an RGB switching circuit RGBS is formed in a region on the lower side. Signals are supplied to the scan signal drive circuit V and the RGB switching circuit RGBS from the semiconductor device SCN. The scan signal drive circuit V is formed of a circuit for supplying scan signals to the below described number of gate signal lines GL in sequence, while the RGB switching circuit RGBS is formed of a circuit for chronologically switching video signals to be supplied to the below described number of drain signal lines DL to signals for red, green and blue.

Here, the scan signal drive circuit V and the RGB switching circuit RGBS are formed on the substrate SUB1 at the same time as the pixels within the liquid crystal display region AR, and each formed of a number of thin film transistors (not shown).

Gate signal lines GL and drain signal lines DL are formed in the liquid crystal display region AR. The gate signal lines GL extend in the direction x and are aligned in the direction y in the figure, and the left ends are connected to the scan signal drive circuit V. The drain signal lines DL extend in the direction y and are aligned in the direction x in the figure, and the lower ends are connected to the RGB switching circuit RGBS.

Regions surrounded by pairs of adjacent gate signal lines GL and pairs of adjacent drain signal lines DL (within dotted circle, for example) correspond to pixel PIX regions. As shown in the equivalent circuit diagram within the solid circle A in the figure, the pixels PIX are formed of a thin film transistor TFT which is turned on by a scan signal coming from the gate signal line GL, and a pixel electrode PX to which a video signal is supplied from the drain signal line DL via the thin film transistor TFT when turned on.

Here, an electrical field is generated between the pixel electrodes PX and a counter electrode (not shown) formed for all of the pixels on the surface of the substrate SUB2 on the liquid crystal side in accordance with the difference in the voltage, where the substrate SUB2 faces the substrate SUB1 with liquid crystal in between, and thus, the liquid crystal is driven by an electrical field.

Though an example of a liquid crystal display device which is incorporated in a cellular phone is given and described in reference to FIG. 2, the present invention is not limited to this type of liquid crystal display device.

In addition, though the pixels in FIG. 2 have a structure referred to as "vertical electrical field structure," the invention is not limited to this, and may have pixels referred to as "lateral electrical field structure," for example.

Configuration of Pixels and Thin Film Transistors

Figure 3A:
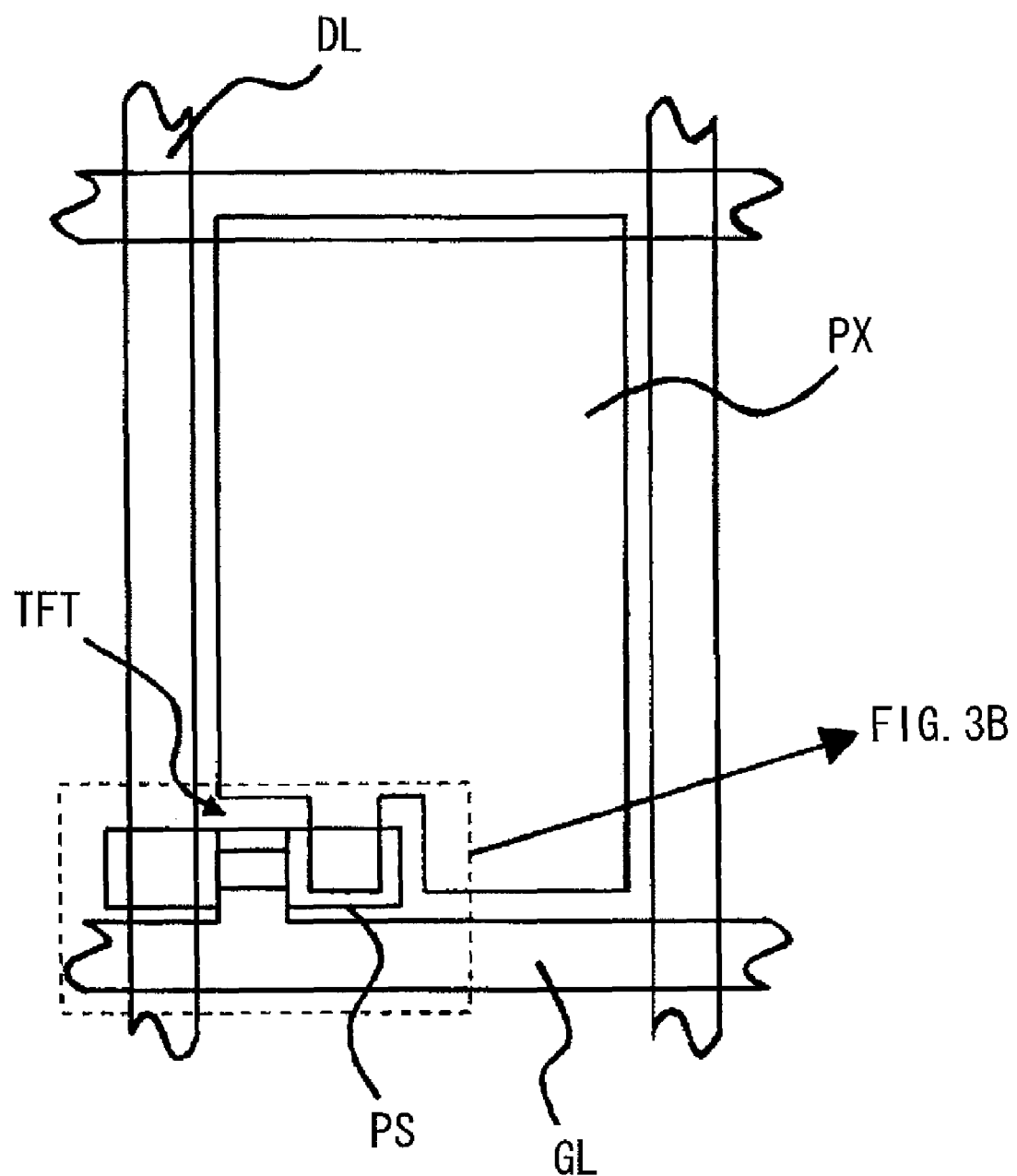
FIG. 3 is a schematic plan diagram showing the structure of a pixel in the display device according to the first embodiment of the present invention.
Figure 3B:
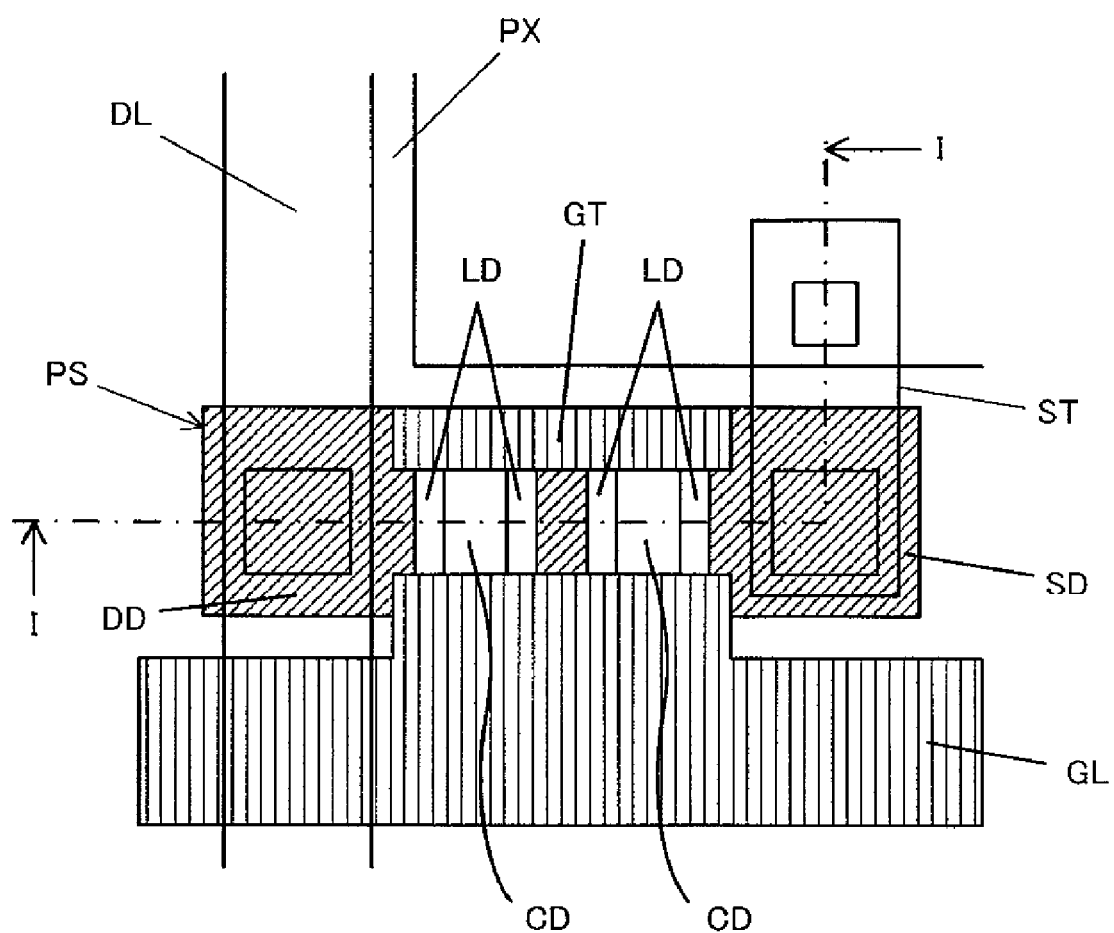

FIG. 3A is a plan diagram showing the concrete structure of a pixel PX, and FIG. 3B is a diagram showing an enlargement of the region where a thin film transistor TFT is formed (within the dotted square α). In addition, FIG. 1 is a cross sectional diagram along line I-I in FIG. 3B.

Figure 1:
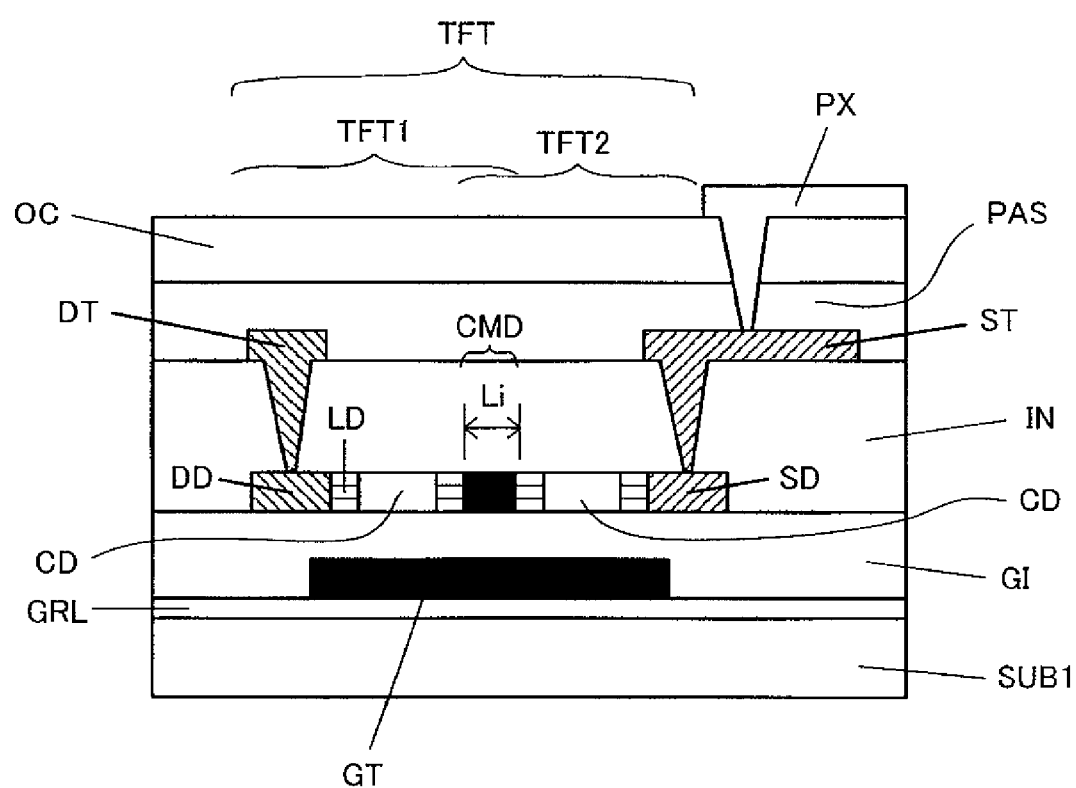
FIG. 1 is a cross sectional diagram showing a major portion of the structure of the display device according to the first embodiment of the present invention.

First, as shown in FIG. 1, a substrate SUB1 is provided, and a base layer GRL is formed of a silicon nitride film on the surface of this substrate SUB1, on the liquid crystal side. The base layer GRL is a film for preventing impurities in the substrate SUB1 from entering into the polycrystal semiconductor layer PS of the below described tin film transistor TFT.

A gate electrode GT is formed on the upper surface of the base layer GRL. The above described thin film transistor TFT is formed of a first thin film transistor TFT1 and a second thin film transistor TFT2, as described below, and the gate electrode of the first thin film transistor TFT1 and the gate electrode of the second thin film transistor TFT2 are formed as an integrated gate electrode GT, and not separate.

A gate insulating film GI is formed of a silicon oxide film or a silicon nitride film on the upper surface of the base layer GRL, so as to cover the gate electrode GT, for example.

A semiconductor layer PS is formed of polysilicon on the upper surface of the gate insulating film GI so as to cross the gate electrode GT, for example.

This semiconductor layer PS is divided into separate regions for the first thin film transistor TFT1 and the second thin film transistor TFT2.

A drain region DD, an LDD region LD, a channel region CD, another LDD region LD and a source region SD are formed in the semiconductor layer PS of the first film transistor TFT1 from the left in the figure, and a source region SD, an LDD region LD, a channel region CD, another LDD region LD and a drain region DD are formed in the semiconductor layer of the second thin film transistor TFT2 from the right in the figure. In this case, the source region SD of the first thin film transistor TFT1 and the drain region DD of the second thin film transistor TFT2 are formed as a common region (hereinafter referred to as common region CMD). The impurity concentration becomes successively higher in the channel region CD, the LDD region LD, the source region SD and the drain region DD in the semiconductor layer PS, in this order.

Here, the gate electrode GT sits on top of the above described common region CMD in the semiconductor layer PS, and is in such a position as to face at least the above described channel region CD and the above described LDD regions LD of the above described first thin film transistor TFT1, as well as the above described channel region CD and the above described LDD regions LD of the above described second thin film transistor TFT2.

Here, the source region SD and the drain region DD of the thin film transistor TFT may be switched, depending on the state in which a bias is applied. In this embodiment, however, the drain region DD is on the side that is connected to the drain signal line DL and the source region SD is on the side that is connected to the pixel electrode PX, for the sake of convenience.

An interlayer insulating film IN is formed on the upper surface of the gate insulating film GI, so as to cover the semiconductor layer PS. A drain electrode DT which is electrically connected to the drain region DD in the semiconductor layer PS through a through hole THd and a source electrode ST which is electrically connected to the source region SD in the semiconductor layer TS through a through hole THs are formed on the upper surface of this interlayer insulating film IN.

Here, the drain electrode DT is formed as part of the drain signal line DL, not shown, and the source electrode ST is formed so as to have an outreaching portion (pad) which is connected to the below described pixel electrode PX.

A passivation film PAS is formed on the upper surface of the interlayer insulating film IN so as to cover the drain electrode DT (drain signal line DL) and the source electrode ST. This passivation film PAS is provided so as to prevent the properties of the thin film transistor TFT from deteriorating due to direct contact with the liquid crystal. A flat film OC is formed on the upper surface of the passivation film PAS through application of a resin material. It is provided to flatten the surface on the liquid crystal side.

A pixel electrode PX is formed of ITO (indium tin oxide) on the surface of the flat film OC, and this pixel electrode PX is electrically connected to the source electrode ST of the thin film transistor TFT through the through hole THp created in the above described flat film OC and passivation film PAS.

In the thus formed display device, the width Li of the common region CMD, which becomes the source region SD of the first thin film transistor TFT1 or the drain region DD of the second thin film transistor TFT2, can be made very narrow, for example 3 μm, in approximately the center portion of the semiconductor layer PS in the thin film transistor TFT. This is because the gate electrode GT of the thin film transistor TFT is formed on top of the above described common region CMD as an integrated gate, and not separate from those of the first thin film transistor TFT1 and the second thin film transistor TFT2. Thus, the gate electrode can be formed taking only the minimum size for developing the photoresist (for example 3 μm) into consideration, and the difference in size between the two separate gate electrodes during processing (for example 0.5 μm), the inconsistency in the size during development (for example 0.5 μm), and the size of the part where the mask for forming the gate electrodes and that for forming the channel region in the semiconductor layer PS do not perfectly overlap (for example 3 μm) need not be taken into consideration using photolithographic technology during the manufacture. Accordingly, a small bottom gate type thin film transistor TFT with a low off current can be formed.

Manufacturing Method

FIGS. 4A to 4E, FIGS. 5F to 5I, and FIGS. 6J to 6L are diagrams showing the steps in the method for manufacturing the display device according to one embodiment of the present invention. These diagrams show the steps for manufacturing the display device corresponding to FIG. 1. In the following, the steps are described in order.

Figure 4A:
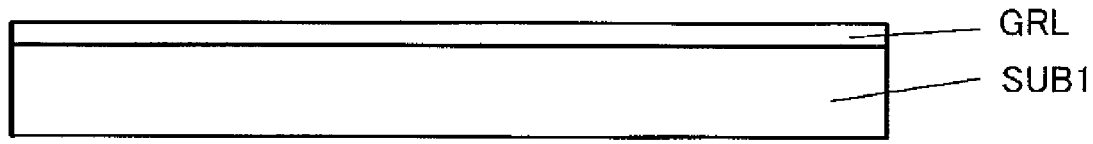
FIGS. 4A to 6L are diagrams showing the steps in the method for manufacturing the display device according to the present invention.

Step 1 (FIG. 4A)

First, a substrate SUB1 made of glass, for example, is prepared, and a base layer GRL is formed of a silicon nitride film on the main surface of this substrate in accordance with a CVD method, for example. The base layer GRL is a film for preventing impurities in the substrate SUB from entering into the polycrystal semiconductor layer PS in the below described thin film transistor TFT.

Figure 4B:
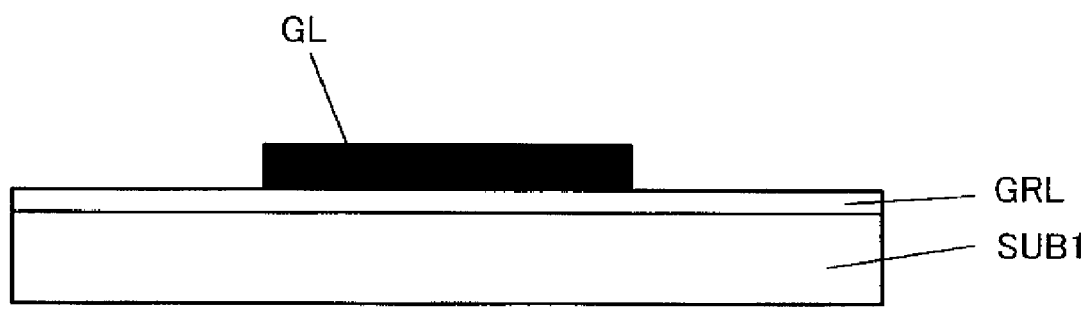

Step 2 (FIG. 4B)

A metal layer is patterned on the upper surface of the base layer GRL on the substrate SUB, so that gate electrodes GT of thin film transistors TFT are formed. These gate electrodes are relatively wide. This is because the integrated gate electrode is formed for the below described first thin film transistor TFT1 and second thin film transistor TFT2, and not separate. The metal layer is made of a high melt point material, for example Mo, W, Ti or alloys of these. This is because the metal layer is exposed to high temperatures in the below described step of crystallizing an amorphous semiconductor layer AS.

Figure 4C:
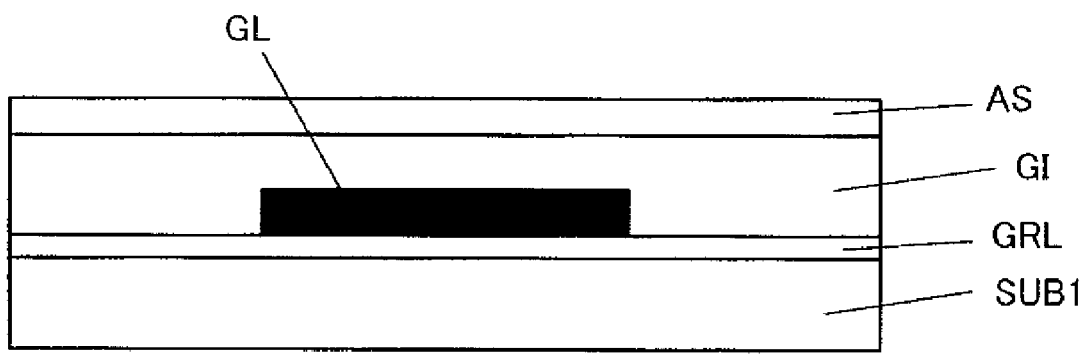

Step 3 (FIG. 4C)

A gate insulating film GI and an amorphous semiconductor layer AS made of amorphous silicon are layered in sequence on the upper surface of the base layer GRL so as to cover the gate electrodes GT, in accordance with a CVD method, for example. A silicon oxide film or a silicon nitride film is used for the gate insulating film I.

Figure 4D:
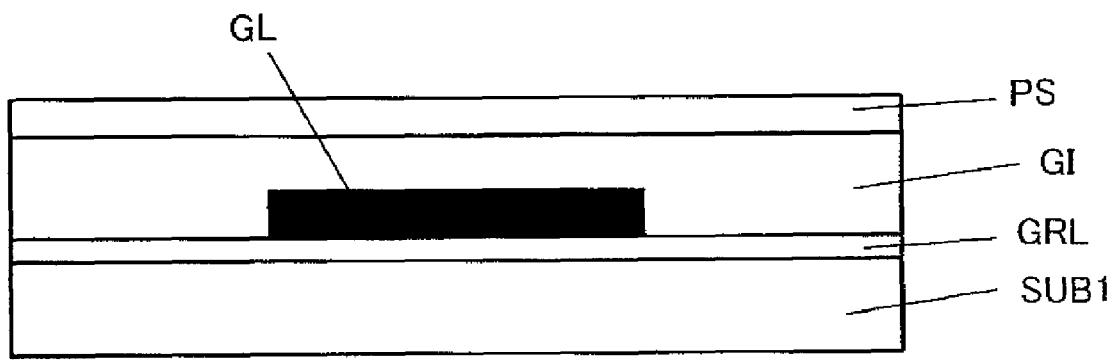

Step 4 (FIG. 4D)

A dehydrogenation process is carried out on the semiconductor layer AS. In addition, the semiconductor layer AS is irradiated with an excimer laser, so that the semiconductor layer AS is crystallized and converted to a polycrystal semiconductor layer PS made of polysilicon.

Figure 4E:
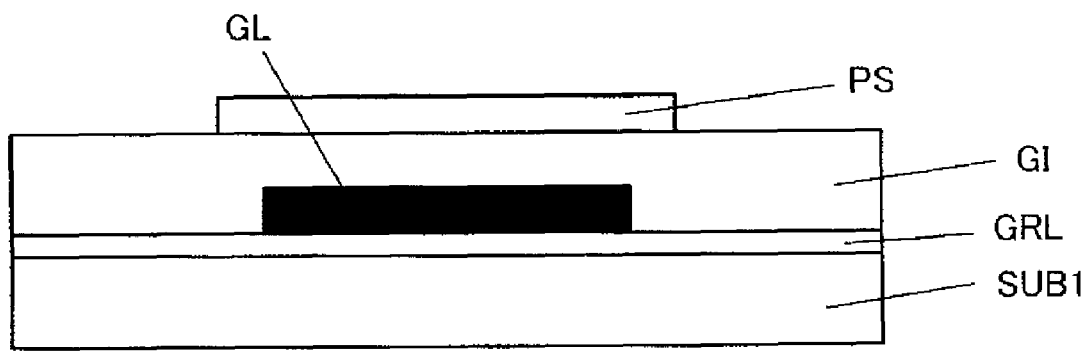

Step 5 (FIG. 4E)

The semiconductor layer PS is patterned into island form using a selective etching method, which is a well-known photolithographic technology.

Figure 5F:
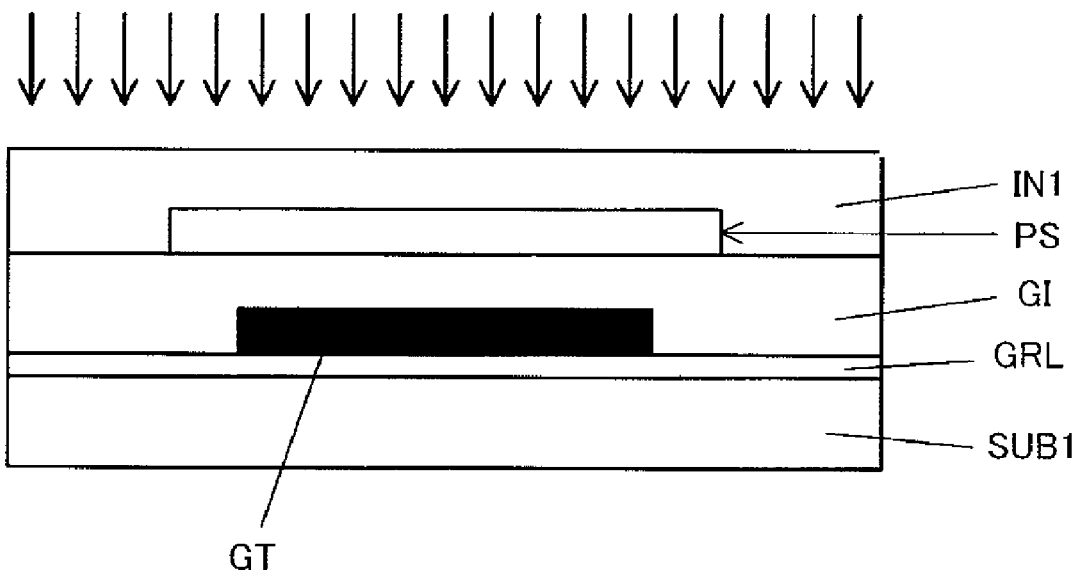

Step 6 (FIG. 5F)

An insulating film IN1 is formed of a silicon oxide film, for example, on the upper surface of the gate insulating film GI, so as to cover the patterned semiconductor layer PS in accordance with a CVD method, for example. This insulating film IN1 functions as a film for allowing impurities to pass through during the below described ion implantation, and thus, it is appropriate for the film to have a thickness of approximately 200 nm or less. In addition, impurities including phosphorous or boron are implanted into the semiconductor layer PS through the insulating film IN1, and thus, the Vth of the thin film transistor TFT, which is completed at a later stage, can be controlled.

Figure 5G:
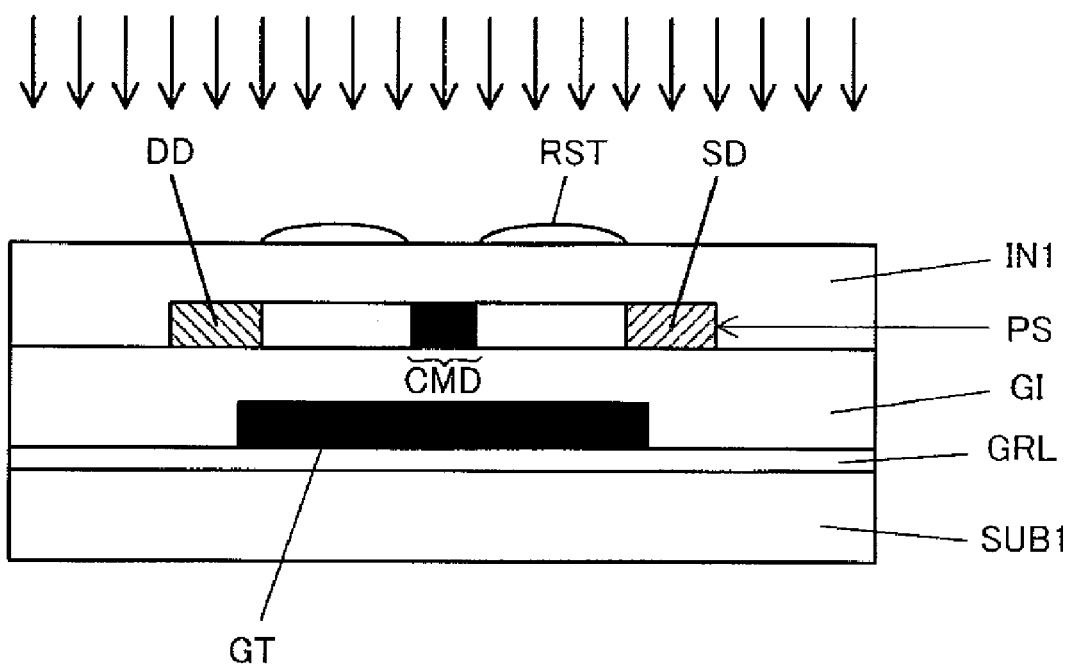

Step 7 (FIG. 5G)

A photoresist is applied on the upper surface of the insulating film IN1 and patterned in accordance with a well-known photolithographic technology, in such a manner that the photoresist film RST for the channel regions and the LDD regions of the thin film transistors TFT1 and TFT2 remain on top of the semiconductor layer PS.

In this case, the gate electrode GL is integrated, and not separate from the gate electrodes for the first thin film transistor TFT1 and the second thin film transistor TFT2. Therefore, the width Li of the common region CMD, which is the source region SD of the first thin film Transistor TFT1 and the drain region DD of the second thin film transistor TFT2 can be set in the semiconductor layer PS without being affected by the gate electrode GL. That is to say, the gate electrode can be formed taking only the minimum size for developing the photoresist (for example 3 μm) into consideration, and therefore, the width Li of the common region CMD can be made as narrow as approximately 3 μm.

Impurities of a high concentration (for example phosphorous) are ion implanted with the above described photoresist film RST remaining, so that the source regions SD and the drain region DD of the thin film transistors TFT1 and TFT2 are formed in the semiconductor layer PS. For the impurities of a high concentration, 1e20 (atm/cm3) is implanted into the polycrystal semiconductor layer PS, for example.

Figure 5H:
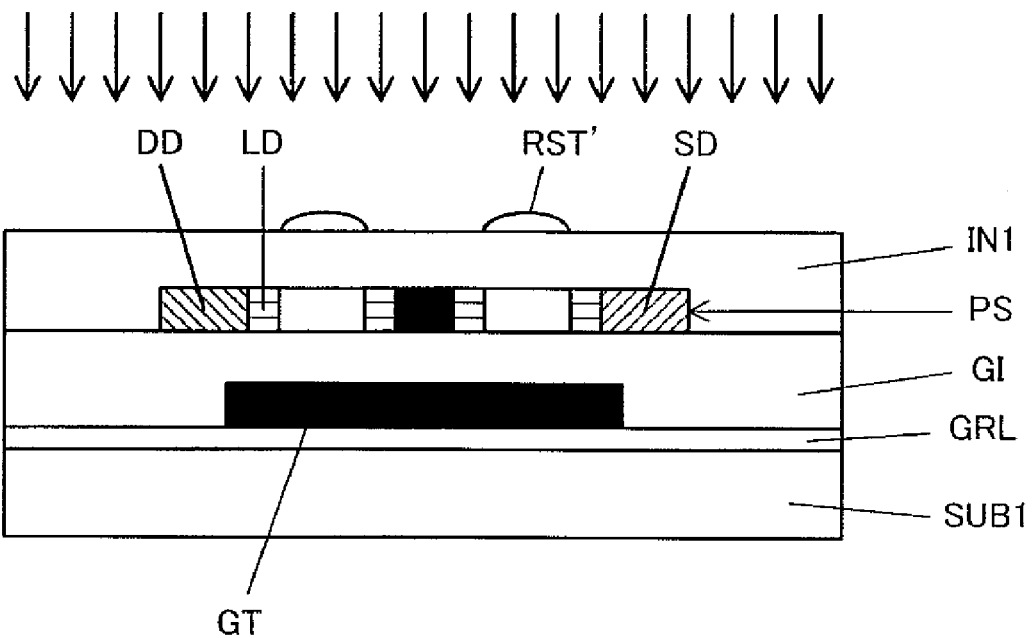

Step 8 (FIG. 5H)

Ashing and heat treatment are carried out on the above described photoresist film RST, so that the outline of the photoresist film recedes inward by approximately 0.5 μm to 2 μm, and thus, a photoresist film RST' in a new pattern is formed. The thus formed photoresist film RST' can prevent the pattern from being affected by the parts of the mask that imperfectly overlap, as compared to the case where a new photoresist is formed in accordance with a photolithographic technology, and the inconsistency can be reduced in the length of the below described LDD layer formed using this photoresist film RST'.

The LDD regions LD of the first thin film transistor TFT1 and the second thin film transistor TFT2 are formed in the semiconductor layer PS by ion implanting impurities of a low concentration (for example phosphorous) with the photoresist film RST' in the new pattern remaining. As concerns the impurities of a low concentration, 1e17 to 1e19 (atm/cm3) is implanted into the polycrystal semiconductor layer PS, for example. After that, the photoresist film RST' in the new pattern is removed.

Figure 5I:
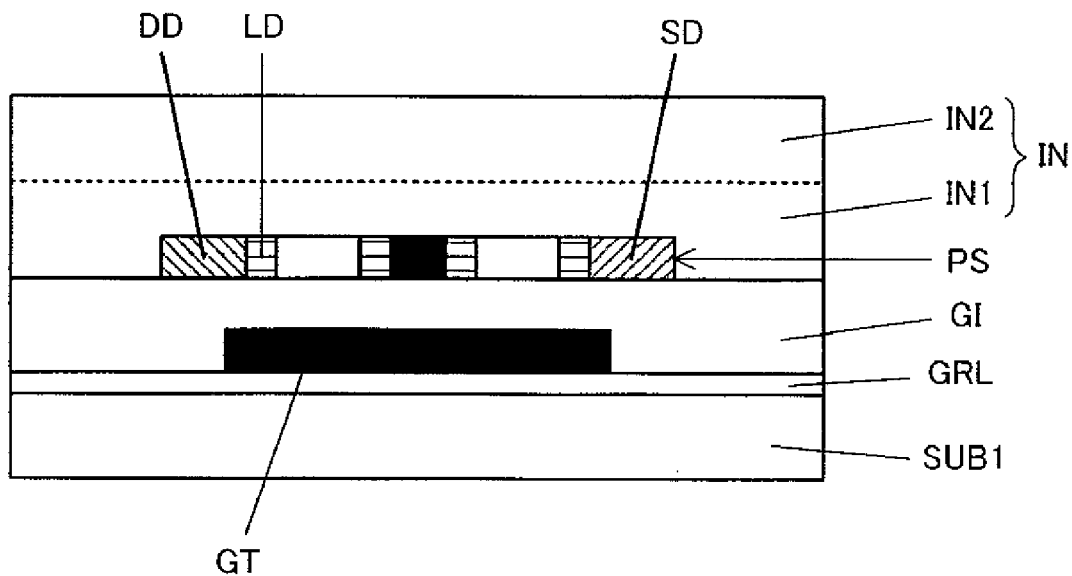

Step 9 (FIG. 5I)

An insulating film IN2 is formed on the upper surface of the insulating film IN1. The insulating film IN2 is provided in order to reduce the capacitance between the below described source electrode ST formed on the insulating film IN2 and the gate electrode GT, as well as between the drain electrode DT and the gate electrode GT. After that, an annealing process is carried out. The annealing process is carried out in order to activate the impurities implanted in the semiconductor layer PS and repair defects in the crystal caused by the impurity implantation. Here, the insulating film IN2 forms an interlayer insulating film IN, together with the above described insulating film IN1.

Figure 6J:
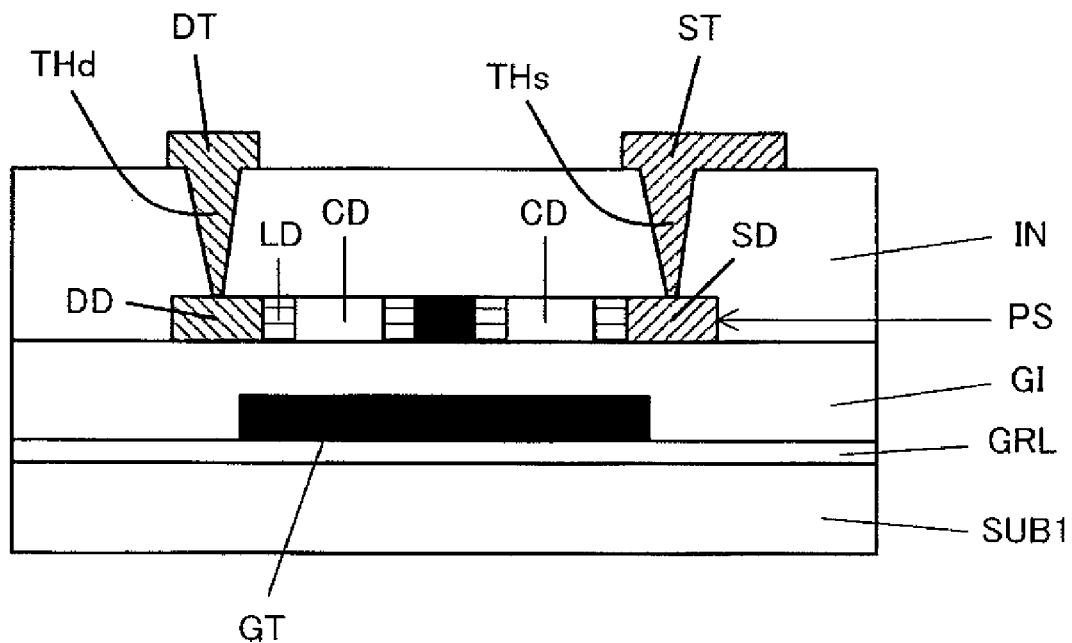

Step 10 (FIG. 6J)

Through holes THd and THs are created in the interlayer insulating film IN in accordance with a selective etching method, which is a well-known photolithographic technology. The through hole THd exposes part of the drain region DD in the semiconductor layer PS, and the through hole THs exposes part of the source region SD in the semiconductor layer PS.

A metal layer is formed over the entirety of the surface of the interlayer insulating film IN, so as to cover the through holes THd and THs, and the drain electrode DT and the source electrode ST of the thin film transistor TFT are formed in accordance with a selective etching method, which is a well-known photolithographic technology. The drain electrode DT is electrically connected to the drain region in the polycrystal semiconductor layer PS through the through hole THd, and the source electrode ST is electrically connected to the source region in the polycrystal semiconductor layer PS through the through hole THs.

Figure 6K:
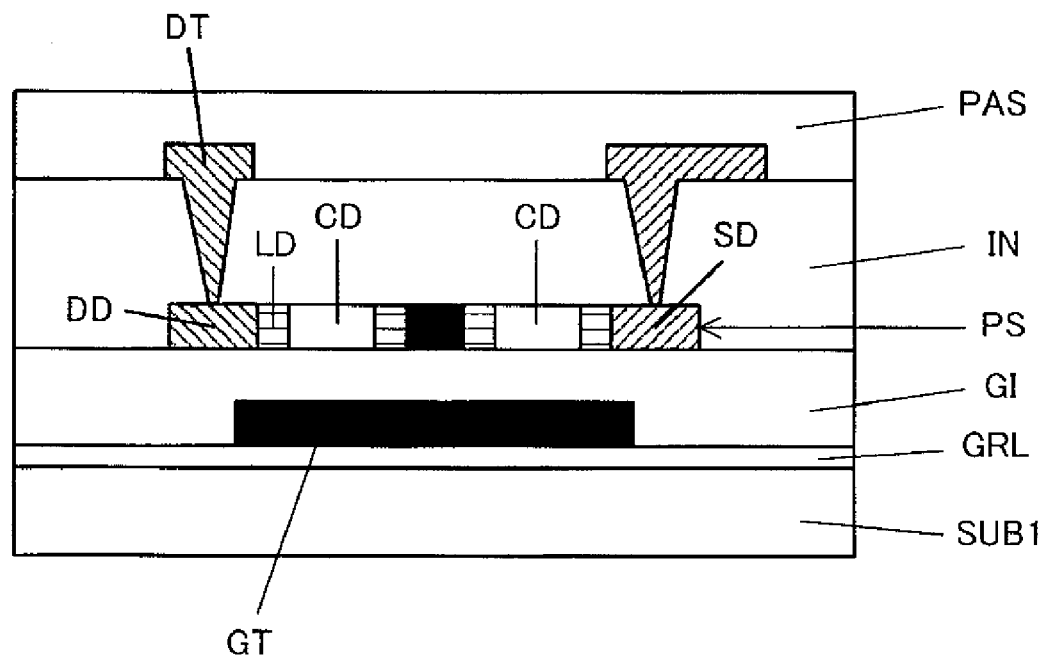

Step 11 (FIG. 6K)

A passivation film PAS is formed on the upper surface of the interlayer insulating film IN so as to cover the drain electrode DT and the source electrode ST. A silicon nitride film is used for this passivation film PAS, for example.

Figure 6L:
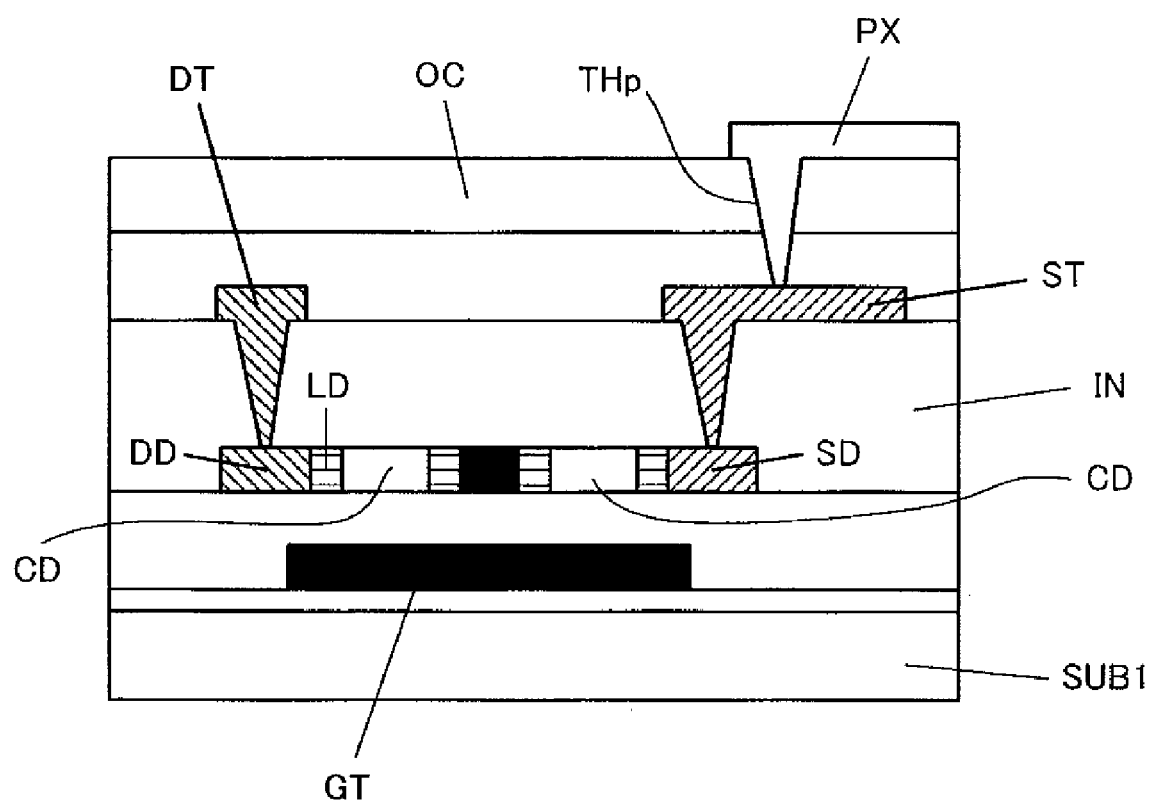

Step 12 (FIG. 6L)

A flat film OC is formed on the upper surface of the passivation film PAS, by applying a resin, for example. A through hole THp is created in the flat film OC and the passivation film PAS, so that part of the drain electrode DP is exposed. A transparent conductive film made of ITO (indium tin oxide), for example, is formed over the entirety of the surface of the flat film OC, so as to cover the through hole THp, and a pixel electrode PX is formed in accordance with a selective etching method, which is a well-known photolithographic technology. This pixel electrode PX is formed so as to be electrically connected to the source electrode ST of the thin film transistor TFT through the through hole THp.

Second Embodiment

Figure 7A:
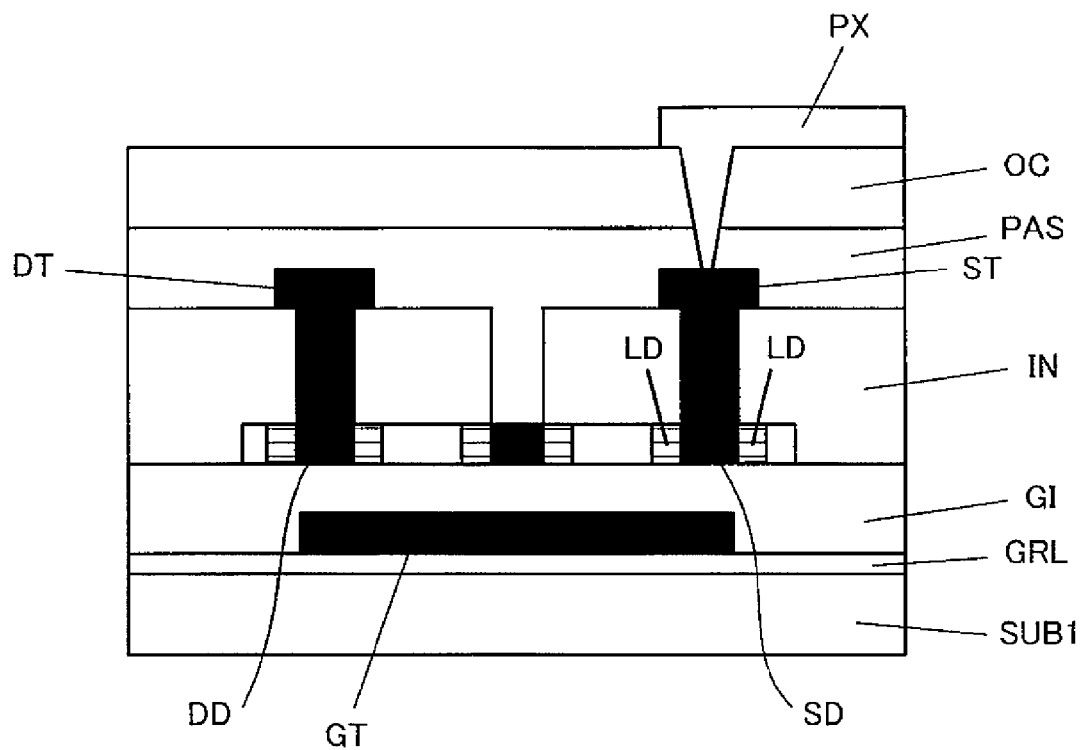
FIG. 7 is a cross sectional diagram showing a major portion of the structure of the display device according to the second embodiment of the present invention.
Figure 7B:
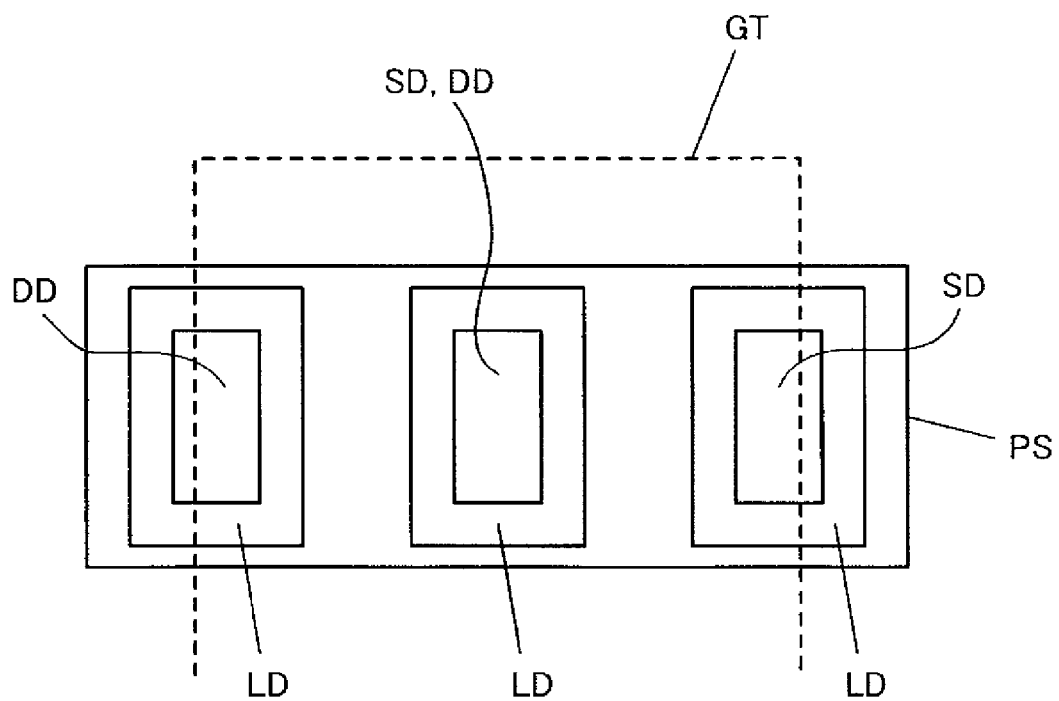
Figure 8:
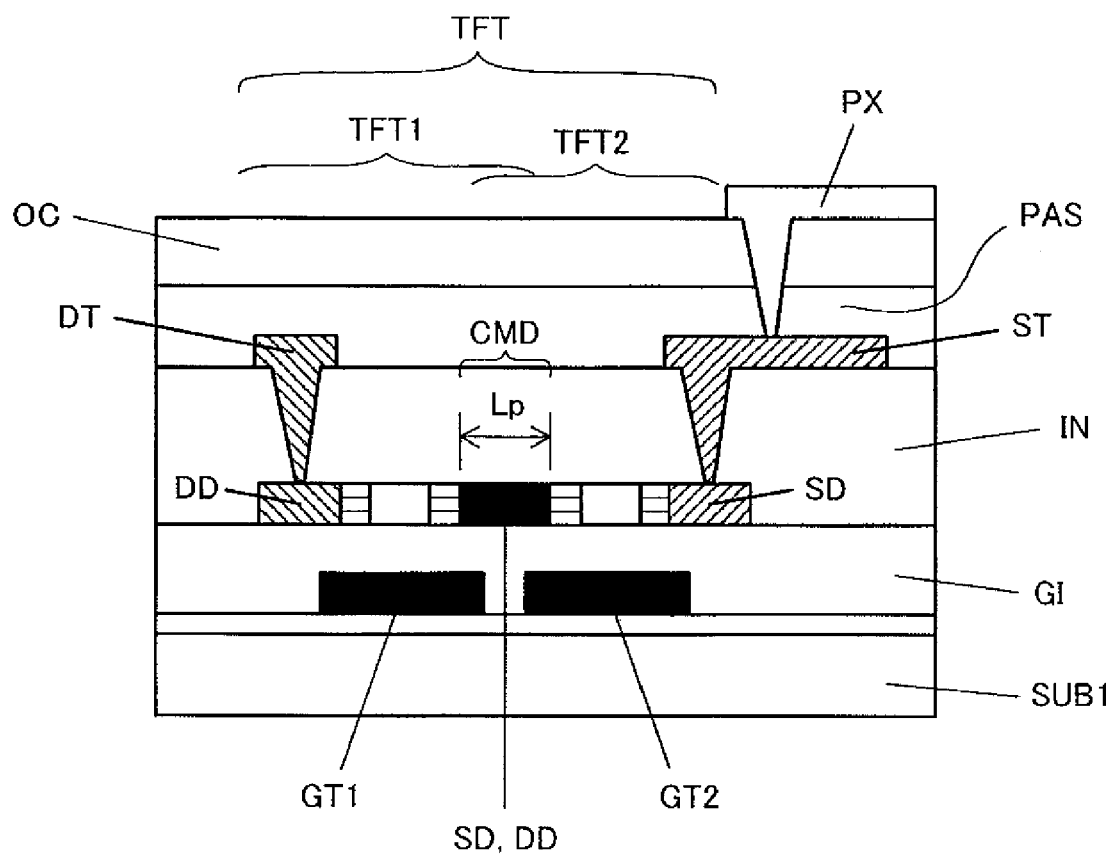
FIG. 8 is a cross sectional diagram showing the configuration of a display device according to the prior art, and corresponds to FIG. 1.

FIGS. 7A and 7B are diagrams showing the structure of the display device according to the second embodiment of the present invention. FIG. 7A is a diagram showing the device corresponding to FIG. 1, and FIG. 7B is a diagram showing the semiconductor layer PS in the thin film transistor TFT as viewed in a plane.

The structure in FIGS. 7A and 7B is different from that in FIG. 1 in that the drain region DD and the source region SD in the first thin film transistor TFT1, and the drain region DD and the source region SD in the second transistor TFT2 are in island form within the semiconductor layer PS. In addition, the LDD region LD in the first thin film transistor TFT1 surrounds the drain region DD and the source region SD, while the LDD region LD in the second thin film transistor TFT2 surrounds the drain region DD and the source region SD.

In this structure also, the gate electrodes GL for the first thin film transistor TFT1 and the second transistor TFT2 are not separate, but integrated in approximately the center portion of the semiconductor layer PS, so as to overlap with the common region CMD, which is the source region SD of the first thin film transistor TFT1 and the drain region of the second thin film transistor TFT2. As a result, the width of the above described common region CMD can be made narrow, for the same reasons as above.

Though the thin film transistors TFT in the above described embodiments have two thin film transistors, they may have three or more thin film transistors. In such a case, one thin film transistor from among the number of thin film transistors provided next to each other is a first thin film transistor, and a second thin film transistor is next to the first thin film transistor.

Though the thin film transistors TFT in the above described embodiments are of a bottom gate type, the invention is not limited to this, and may have top gate type thin film transistors.

The thin film transistors TFT in the above described embodiments are formed within pixels. However, the thin film transistors may be applied as those forming the scan signal drive circuit V or the RGB switching circuit RGBS shown in FIG. 2.

In the thin film transistors TFT according to the above described embodiments, the side that is connected to the drain signal line DL is the drain region DD, and the side that is connected to the pixel electrode PX is the source region SD. As described above, however, this relationship may be different depending on the state in which a bias is applied, and the side that is connected to the drain signal line DL may be the source region SD and the side that is connected to the pixel electrode PX the drain region DD.

What is claimed is:

1. A display device where thin film transistors are formed on a substrate, characterized in that
    in said thin film transistors, a gate electrode is formed on a semiconductor layer with a gate insulating film in between,
    said thin film transistors include at least a first thin film transistor and a second thin film transistor, and said semiconductor layer is divided into individual regions for each film transistor,
    said semiconductor layer is provided with a common region shared either by the drain region of said first thin film transistor and the source region of said second thin film transistor or by the source region of said first thin film transistor and the drain region of said second thin film transistor,
    in the first thin film transistor and the second thin film transistor, the semiconductor layer is provided with LDD regions where the impurity concentration is lower than in said drain region and said source region, between the channel region and the drain region, as well as between the channel region and the source region, and
    said gate electrode comprises an integrated gate electrode formed as one body for said first thin film transistor and said second thin film transistor that faces at least said common region in said semiconductor layer, said channel region and said LDD regions of said first thin film transistor and said channel region and said LDD regions of said second thin film transistor.

2. The display device according to claim 1, characterized in that said semiconductor layer is formed of polysilicon.

3. The display device according to claim 1, characterized in that the gate electrode is formed on said substrate side of the semiconductor layer with a gate insulating film in between in said thin film transistors.

4. The display device according to claim 1, characterized in that said drain regions, said source regions and said common regions are in island form within the individual regions of said semiconductor layer, and said LDD regions are formed so as to surround said drain regions, said source regions and said common regions as viewed in a plane.

5. The display device according to claim 1, characterized in that said thin film transistors are formed within separate pixels.

6. The display device according to claim 1, characterized in that said thin film transistors are formed within a scan signal drive circuit.

7. The display device according to claim 1, characterized in that said thin film transistors are formed within an RGB switching circuit.

8. The display device according to claim 1, characterized in that the display device is a liquid crystal display device.

* * * * *